Aug. 12, 1941.     T. D. JONES     2,252,260
MILK BOTTLE HOLDER
Filed May 29, 1939
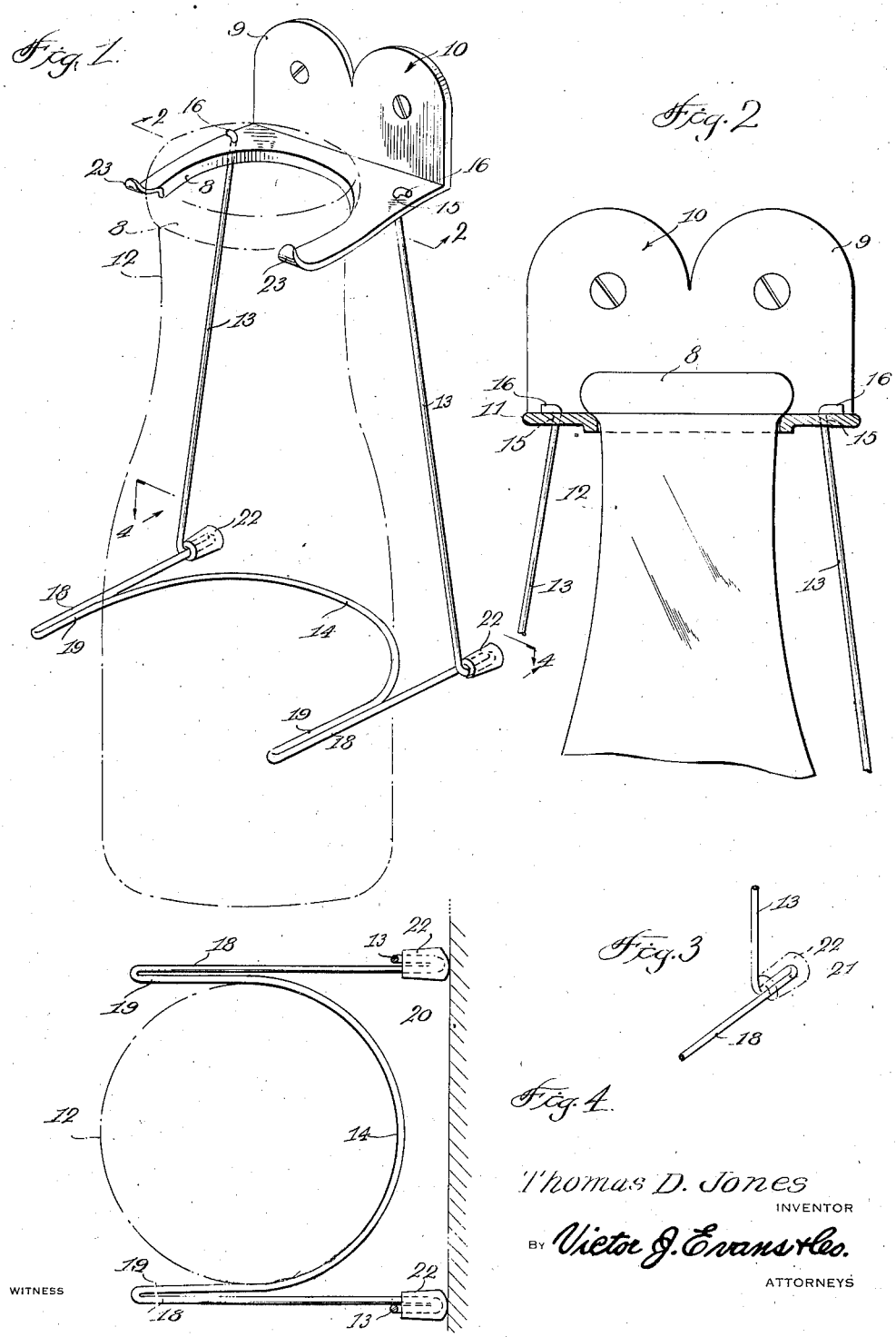
Thomas D. Jones
INVENTOR Patented Aug. 12, 1941

2,252,260

UNITED STATES PATENT OFFICE 2,252,260

MILK BOTTLE HOLDER

Thomas D. Jones, Philadelphia, Pa.

Application May 29, 1939, Serial No. 276,451

1 Claim. (Cl. 248—312)

This invention relates to a milk bottle holder and has for an object to provide a milk bottle holder which may be used for hanging up milk bottles on porches or in hallways out of reach of dogs and cats.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view of the device.

Figure 2 is a cross sectional view of the device taken approximately on the line 2—2 of Figure 1.

Figure 3 is a perspective view of part of the wire support.

Figure 4 is a cross sectional view of the device taken approximately on the line 4—4 of Figure 1.

Referring now to the drawing in which like characters of reference designate similar parts in the various views, 10 designates an L-shaped bracket adapted to be secured by screws to a door frame or the like. The bracket has the horizontal rigid member 11 cut away at the front to provide an opening 17 to receive the neck of a milk bottle 12.

Arms 13 formed of wire extend downwardly from the horizontal rigid member of the bracket and at the lower ends are directed forwardly to provide horizontally extending arms 18. At the front ends of the arms 18 the wire is directed rearwardly as shown at 19 and then directed transversely across the space between the arms 18 to form a substantially U-shaped support 14 adapted to embrace the rear side of the body of the milk bottle 12 suspended by the neck in the bracket 10.

The arms 13 pass through openings 15 formed in the horizontal rigid member 11 of the bracket and have laterally bent upper ends 16 contacting with the upper side of the member to secure the arms to the bracket 10. The arms 13 are located in a plane situated between the vertical member 9 of the bracket and the rear wall of the neck-receiving opening 17 in the horizontal rigid member 11 of the bracket. The wire is bent to provide loops 21 at the meeting ends of the arms 13 and 18 as shown in Figure 3. These loops space the milk bottle from the wall 20 or other support to which the bracket 10 may be attached. To prevent injury to the wall 20, the loops 21 are covered with rubber 22.

The horizontal rigid member 11 of the bracket is provided at the front with upstanding projections 23 having rounded front surfaces and rounded top surfaces. The rounded front surfaces guide the neck of the milk bottle accurately into the bottle receiving opening 17. The projections engage the bead 8 of the bottle neck on opposite sides thereof when the bottle is supported by the horizontal rigid member 11 of the bracket and prevent the bottle from accidentally being dislodged forwardly from the bracket. The bottle must be raised bodily so that the bead clears the projections 23 before the bottle can be removed from the bracket.

From the above description it is thought that the construction and operation of the invention will be fully understood without further explanation.

What is claimed is:

A milk bottle holder comprising an L-shaped bracket having a vertical member adapted to be secured to a door frame or the like, and a horizontal member having an opening on the front side to receive the neck of a milk bottle, a frame formed of stiff wire bent to form arms extending downwardly from the horizontal member, arms extending forwardly from the lower ends of the first named arms, a U-shaped support extending across the space between and in the same plane as the forwardly extending arms adapted to embrace the rear side of a milk bottle suspended by the neck in said opening in the horizontal member of the bracket, the downwardly extending arms having laterally bent upward ends contacting with the upper face of the horizontal member of the bracket to secure the arms to the bracket, said downwardly extending arms being disposed in a plane between the vertical member of the bracket and the rear end of the neck receiving opening in the horizontal member of the bracket, loops formed at the meeting ends of the downwardly extending arms and the forwardly extending arms on the same side of the frame extending rearwardly in alignment with the forwardly extending arms adapted to space the milk bottle from said door frame or the like and yielding housings for the loops forming bumpers to engage said door frame or the like, the free ends of the housings terminating in the plane of the vertical member of the L-shaped bracket.

THOMAS D. JONES.